(12) United States Patent
Okano

(10) Patent No.: US 10,330,519 B2
(45) Date of Patent: Jun. 25, 2019

(54) FLOW RATE SENSOR CORRECTION DEVICE, PROGRAM FOR CORRECTION DEVICE, AND CORRECTION METHOD

(71) Applicant: HORIBA STEC, Co., Ltd., Kyoto-shi, Kyoto (JP)

(72) Inventor: Hiroyuki Okano, Kyoto (JP)

(73) Assignee: HORIBA STEC, CO., Ltd., Kyoto-shi, Kyoto (JP)

( * ) Notice: Subject to any disclaimer, the term of this patent is extended or adjusted under 35 U.S.C. 154(b) by 218 days.

(21) Appl. No.: 15/377,803

(22) Filed: Dec. 13, 2016

(65) Prior Publication Data

US 2017/0167912 A1 Jun. 15, 2017

(30) Foreign Application Priority Data

Dec. 15, 2015 (JP) ................. 2015-243959

(51) Int. Cl.
*G01F 1/68* (2006.01)
*G01F 25/00* (2006.01)

(52) U.S. Cl.
CPC ............ *G01F 25/0007* (2013.01); *G01F 1/68* (2013.01)

(58) Field of Classification Search
CPC .............................. G01F 1/68; G01F 25/0007
See application file for complete search history.

(56) References Cited

U.S. PATENT DOCUMENTS

| | | | |
|---|---|---|---|
| 5,161,410 A * | 11/1992 | Davey ................... | G01F 1/684 |
| | | | 73/204.22 |
| 9,417,108 B2 * | 8/2016 | Ito ............................ | G01F 1/78 |
| 2002/0198668 A1 * | 12/2002 | Lull .................... | G01F 25/0007 |
| | | | 702/45 |

FOREIGN PATENT DOCUMENTS

JP 2013134231 A 7/2013

* cited by examiner

*Primary Examiner* — Mischita L Henson
(74) *Attorney, Agent, or Firm* — Alleman Hall Creasman & Tuttle LLP

(57) ABSTRACT

In order to reduce a flow rate error over the entire range of a sensor output value even when the relationship between the sensor output value and a flow rate value is poor in linearity, a flow rate sensor correction device includes: a sensitivity setting part adapted to set a sensitivity coefficient on the basis of an initial value and a sensitivity correction value and adjust the sensitivity of the flow rate sensor; a function calculation part adapted to calculate a corrected flow rate characteristic function on the basis of a function correction value, which is determined on the basis of the flow rate value, and a standard flow rate characteristic function; and a function modification part adapted to make a function storage part store, as a flow rate characteristic function, a final flow rate characteristic function based on the corrected flow rate characteristic.

12 Claims, 7 Drawing Sheets

FLOW RATE SENSOR CORRECTION DEVICE, PROGRAM FOR CORRECTION DEVICE, AND CORRECTION METHOD

TECHNICAL FIELD

The present invention relates to a flow rate sensor correction device, a program for the correction device, and a correction method for correcting a flow rate characteristic function that converts a sensor output value x to a flow rate value y in a flow rate sensor.

BACKGROUND ART

For example, a thermal type flow rate sensor is configured to be able to measure a flow rate using the fact that between a flow rate and the quantity of heat removed from an object, a predetermined relationship exists. Specifically, as a sensor mechanism, two electrical resistive elements are provided in a flow path, voltages are controlled so as to keep the temperatures of the respective electrical resistive elements constant, and from the values of the respective voltages at the time, a sensor output value x having a predetermined relationship with a flow rate is calculated (see Patent Literature 1).

In order to convert the sensor output value x to a flow rate value y, a flow rate characteristic function with a sensor output value x as an input and a flow rate value y as an output is used. The flow rate characteristic function is affected by the specific difference of the flow rate sensor from others. In other words, a flow rate characteristic function is a function specific to each flow rate sensor. Accordingly, for example, when directly using a standard flow rate characteristic function f(x) obtained by averaging the sensor characteristics of multiple flow rate sensors, an error occurs between a calculated flow rate value y and the flow rate value y of actually flowing fluid. For this reason, a correction is made in order to bring the standard flow rate characteristic function f(x) close to an actual flow rate characteristic function F(x) of an actual flow rate sensor.

For example, as illustrated in FIG. 7(a), the standard flow rate characteristic function f(x) is such that linearity is substantially kept from the zero point to the span point.

As illustrated in FIG. 7(b) next, a sensor output value x obtained when flowing standard gas such as $N_2$ at a prescribed flow rate value in an actual sensor is measured as a sample value. As the prescribed flow rate value, for example, a span flow rate value obtained from the standard flow rate characteristic function f(x) at the span point is set. Then, by inputting the sample value to the standard flow rate characteristic function f(x), a calculated flow rate value is calculated, and further by multiplying the standard flow rate characteristic function f(x) by a function correction value n obtained by dividing the prescribed flow rate value by the calculated flow rate value, a final flow rate characteristic function h(x) having an adjusted slope is calculated. The final flow rate characteristic function h(x) calculated in this manner is used in place of the standard flow rate characteristic function f(x). Accordingly, the flow rate sensor can be corrected so as to inevitably output the span flow rate value when the sensor output value x is the same as the sample value.

However, when making a correction as described above even though the linearity of an actual flow rate characteristic function F(x) is poor as illustrated in FIG. 7(c), the final flow rate characteristic function h(x) outputs a flow rate value y smaller than an actual flow rate value y from the zero point to the span point. That is, a flow rate error occurs except for the span flow rate value.

CITATION LIST

Patent Literature

Patent Literature 1: Japanese Unexamined Patent Publication JP-A 2013-134231

SUMMARY OF INVENTION

Technical Problem

The present invention is made in consideration of the above-described problem, and intends to provide a flow rate sensor correction device, program for the correction device, and correction method that even when the relationship between a sensor output value x and a flow rate value y in an actual flow rate sensor is poor in linearity, can reduce a flow rate error over the entire range of the sensor output value x.

Solution to Problem

That is, the flow rate sensor correction device according to the present invention is a correction device that corrects a flow rate characteristic function of a flow rate sensor including: a sensor mechanism adapted to output an output signal corresponding to the flow rate of fluid flowing through a flow path; a sensor output calculation part adapted to calculate a sensor output value x on the basis of a value indicated by the output signal and a sensitivity coefficient; a function storage part adapted to store the flow rate characteristic function with a sensor output value x as an input and a flow rate value y as an output; and a flow rate calculation part adapted to calculate a flow rate value y on the basis of the sensor output value x calculated by the sensor output calculation part and the flow rate characteristic function. In addition, the correction device includes: a sensitivity setting part adapted to set the sensitivity coefficient on the basis of an initial value and a sensitivity correction value m and adjust the sensitivity of the flow rate sensor; a function calculation part adapted to calculate a corrected flow rate characteristic function g(x) on the basis of a function correction value n, which is determined on the basis of the flow rate value y outputted from the flow rate sensor, and a standard flow rate characteristic function f(x); and a function modification part adapted to make the function storage part store, as the flow rate characteristic function, a final flow rate characteristic function h(x) based on the corrected flow rate characteristic function g(x) calculated by the function calculation part.

Also, the program for a correction device stored in a program storage medium and according to the present invention is a program for a correction device that corrects a flow rate characteristic function of a flow rate sensor including: a sensor mechanism adapted to output an output signal corresponding to the flow rate of fluid flowing through a flow path; a sensor output calculation part adapted to calculate a sensor output value x on the basis of a value indicated by the output signal and a sensitivity coefficient; a function storage part adapted to store the flow rate characteristic function with a sensor output value x as an input and a flow rate value y as an output; and a flow rate calculation part adapted to calculate a flow rate value y on the basis of the sensor output value x calculated by the sensor output calculation part and the flow rate characteristic function. In addition, the program instructs a computer to fulfil functions as: a sensitivity setting part adapted to set the sensitivity coefficient on the basis of an initial value and a sensitivity correction value m and adjust the sensitivity of the flow rate sensor; a function calculation part adapted to calculate a corrected flow rate characteristic function g(x) on the basis of a function correction value n, which is determined on the basis of the flow rate value y outputted from the flow rate sensor, and a standard flow rate characteristic function f(x); and a function modification part adapted to make the function storage part store, as the flow rate characteristic function, a final flow rate characteristic function h(x) based on the corrected flow rate characteristic function g(x) calculated by the function calculation part. Note that the program for the correction device may be one electronically delivered or one stored in a program storage medium such as a CD, DVD, or flash memory.

Further, the correction method according to the present invention is a correction method that corrects a flow rate characteristic function of a flow rate sensor including: a sensor mechanism adapted to output an output signal corresponding to the flow rate of fluid flowing through a flow path; a sensor output calculation part adapted to calculate a sensor output value x on the basis of a value indicated by the output signal and a sensitivity coefficient; a function storage part adapted to store the flow rate characteristic function with a sensor output value x as an input and a flow rate value y as an output; and a flow rate calculation part adapted to calculate a flow rate value y on the basis of the sensor output value x calculated by the sensor output calculation part and the flow rate characteristic function. In addition, the correction method includes steps of: setting the sensitivity coefficient on the basis of an initial value and a sensitivity correction value m and adjusting the sensitivity of the flow rate sensor; calculating a corrected flow rate characteristic function g(x) by multiplying a standard flow rate characteristic function f(x) by a function correction value n determined on the basis of the flow rate value y outputted from the flow rate sensor; and making the function storage part store, as the flow rate characteristic function, a final flow rate characteristic function h(x) based on the corrected flow rate characteristic function g(x) calculated by a function calculation part.

Such configurations make it possible to, for example, when the linearity of an actual flow rate characteristic function F(x) of the flow rate sensor in an initial state where the sensitivity coefficient is set to the initial value is poor, change the sensitivity coefficient and change to a new sensitivity-adjusted actual flow rate characteristic function G(x) having good linearity.

For this reason, the corrected flow rate characteristic function g(x) obtained from the standard flow rate characteristic function f(x) on the basis of the function correction value n based on the flow rate value y outputted from the flow rate sensor can match the sensitivity-adjusted actual flow rate characteristic function G(x) substantially wholly to prevent a flow rate error from occurring over the entire range of the sensor output value x.

In order to make it possible to grasp how the sensitivity-unadjusted actual flow rate characteristic function F(x) shifts from the standard flow rate characteristic function f(x), determine whether to change the sensitivity coefficient in a direction to increase or decrease, and appropriate adjust the sensitivity, it is only necessary that the correction device further includes a first measured value storage part adapted to, when the fluid flowing through the flow path at a first flow rate value F1, store the first flow rate value F1 and a sensitivity-unadjusted flow rate value S1 that is a flow rate value y outputted from the flow rate sensor in an initial state where the sensitivity coefficient is set to the initial value, and the sensitivity setting part is configured to change the sensitivity correction value m depending on the difference between the first flow rate value F1 and the sensitivity-unadjusted flow rate value S1.

In order to make it possible to prevent the change amount of the sensitivity coefficient from being made excess or deficient, decrease the occurrence amount of the flow rate error over substantially the entire range of the sensor output value x, and increase the S/N ratio of the sensor output value x to become resistant to noise, it is only necessary that the sensitivity setting part includes: an adjustment effect storage part adapted to store an adjustment effect relationship that is the relationship between the sensitivity correction value m and the difference between when setting the sensitivity coefficient based on the sensitivity correction value m, an actual flow rate value y newly produced at a predetermined sensor output value x and a flow rate value y outputted from the flow rate sensor; and a sensitivity determination part adapted to, on the basis of the adjustment effect relationship, determine the sensitivity correction value m that cancels out the difference between the first flow rate value F1 and the sensitivity-unadjusted flow rate value S1.

In order to make it possible to evaluate linearity in a range where a flow rate error occurring depending on the linearity of the sensitivity-unadjusted actual flow rate characteristic function is likely to appear, and set the sensitivity correction value m to an appropriate value, it is only necessary that the first flow rate value F1 is a flow rate value y smaller than the span of the flow rate value y set in the flow rate sensor.

In order to match the corrected flow rate characteristic function g(x) with the sensitivity-adjusted actual flow rate characteristic function over the entire range of the sensor output value x, it is only necessary that the correction device further includes a second measured value storage part adapted to, when the fluid flowing through the flow path at a second flow rate value F2, store the second flow rate value F2 and a sensitivity-adjusted flow rate value S2 that is a flow rate value y outputted from the flow rate sensor after sensitivity adjustment, and the function calculation part is configured to multiply the standard flow rate characteristic function f(x) by as the function correction value n, a value obtained by dividing the second flow rate value F2 by the sensitivity-adjusted flow rate value S2.

In order to make it possible to output a span flow rate value, which is the most important flow rate value y, from the flow rate sensor without error and further increase reliability, it is only necessary that the second flow rate value F2 is the span of the flow rate value y set in the flow rate sensor.

In order to make it possible to, even when by flowing gas other than standard gas such as nitrogen through the flow path, the linearity of the actual flow characteristic function F(x) significantly deteriorates in a range where the sensor output value x is, for example, close to the span, substantially match the sensitivity-adjusted actual flow rate characteristic function G(x) and the final flow rate characteristic function h(x) with each other, and reduce the flow rate error in a wider range, it is only necessary that the correction device further includes a correction term calculation part adapted to calculate a correction term on the basis of the thermal conductivity $\lambda$ of the fluid and the sensitivity correction value m, and the function modification part is configured to calculate the final flow rate characteristic function h(x) by adding the correction term to the corrected flow rate characteristic function g(x), and make the function storage part store the final flow rate characteristic function h(x).

In order to, in a range where the sensor output value x is small, make the corrected flow rate characteristic function g(x) dominant without having the effect of the correction term, and in a range where the sensor output value x is large, greatly produce the effect of the correction term, it is only necessary that the correction term is one obtained by multiplying a product of the sensitivity correction value m and the square of the reciprocal of the thermal conductivity λ of the fluid by the fourth power of the sensor output value x.

A flow rate sensor configured to output a flow rate value y on the basis of the final flow rate characteristic function h(x) stored by the correction device according to the present invention can reduce a flow rate error over the entire range of a sensor output value x to output the flow rate value y with accuracy.

A flow rate control device including the flow rate sensor according to the present invention can increase flow rate control accuracy in a range of the sensor output value x.

Advantageous Effects of Invention

Thus, the flow rate sensor correction device, program for the correction device, and correction method according to the present invention make it possible to, for example, convert the actual flow rate characteristic function F(x) having poor linearity in the initial state to the sensitivity-adjusted actual flow rage characteristic function G(x) having good linearity using the sensitivity correction value m, and on the basis of the standard flow rate characteristic function f(x) and the function correction value n, match the corrected flow rate characteristic function g(x) with the function G(x), and therefore the flow rate error can be reduced over substantially the entire range of the sensor output value x.

DESCRIPTION OF EMBODIMENTS

One embodiment of the present invention will be described with reference to drawings.

Figure 1:
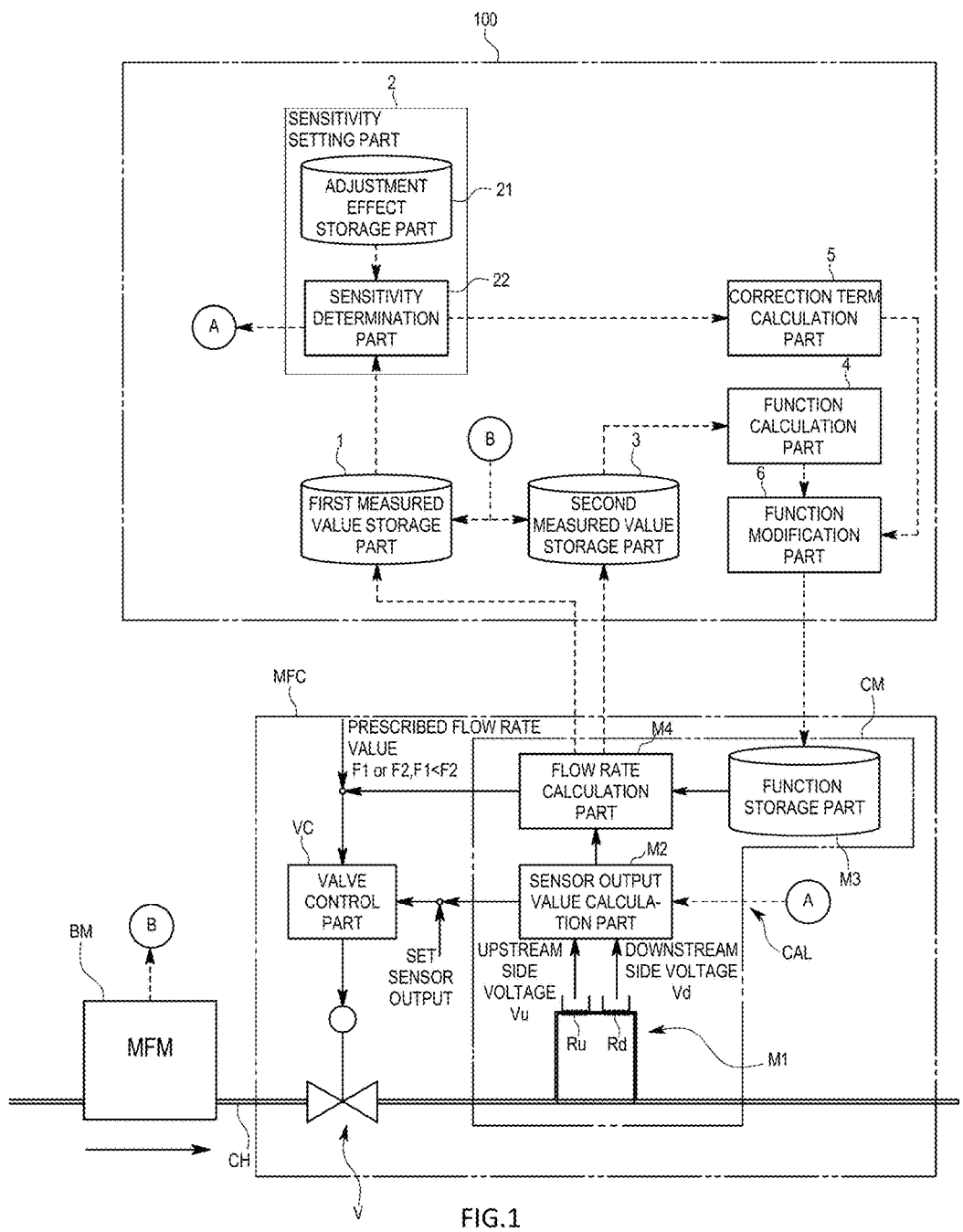
FIG. 1 is a schematic diagram illustrating a correction device according to one embodiment of the present invention.

As illustrated in FIG. 1, a flow rate correction device 100 of the present embodiment is one used for making a correction to reduce a flow rate error over the entire range of a sensor output value x by accommodating the specific difference of, for example, a thermal type flow rate sensor at the time of factory shipment.

Note that the thermal type flow rate sensor as a correction target constitutes part of a thermal type mass flow controller MFC. That is, as illustrated in FIG. 1, the mass flow controller MFC is one including: a valve V provided in a flow path; the flow rate sensor adapted to measure a flow rate through the flow path; and a valve control part VC adapted to control the opening level of the valve V on the basis of an output from the flow rate sensor, in which these parts are packaged in one casing.

The details of the correction target flow rate sensor will be described.

As illustrated in FIG. 1, the flow rate sensor CM includes: a sensor mechanism M1 adapted to output an output signal corresponding to the flow rate of fluid flowing through the flow path; and a calculation part CAL adapted to calculate the flow rate on the basis of the output from the sensor mechanism M1.

The sensor mechanism M1 includes: a U-shaped narrow tube that is provided so as to branch from the flow path through which the fluid flows and merge again; and a pair of electrical resistance wires that is provided wound on the narrow tube. Each of the electrical resistance wires is connected to a constant temperature circuit (not illustrated) so as to keep the temperature thereof constant. The fluid flowing through the narrow tube transports heat from the upstream side electrical resistance wire to the downstream side electrical resistance wire, and therefore an upstream side voltage applied to the upstream side electrical resistance wire has a larger value than a downstream side voltage applied to the downstream side electrical resistance wire. The difference between the upstream side voltage and the downstream side voltage has a predetermined relationship with the flow rate of the fluid, and therefore on the basis of the values of them, the calculation part CAL calculates the flow rate. In this embodiment, the sensor mechanism M1 is configured to output the output signal indicating the following calculation value FI on the basis of the upstream side voltage and the downstream side voltage.

$$FI=(Vu-Vd)/(Vu+Vd)$$

Here, FI represents the value indicated by the output signal of the sensor mechanism M1, Vu the upstream side voltage, and Vd the downstream side voltage.

The calculation part CAL is, for example, a computer including a CPU, a memory, A/D and D/A converters. Also, a flow rate calculation program stored in the memory is executed, and thereby the calculation part CAL cooperates with the respective devices to implement functions as at least a sensor output calculation part M2, function storage part M3, and flow rate calculation part M4.

The sensor output calculation part M2 calculates a sensor output value x on the basis of the value indicated by the output signal outputted from the sensor mechanism M1 and a set sensitivity coefficient. More specifically, the sensor output calculation part M2 is configured to multiply the value FI indicated by the output signal of the sensor mechanism M1 by the set sensitivity coefficient amp. Note that the sensitivity coefficient amp is set to 1 (100%) as an initial setting. That is, the sensor output calculation part M2 calculates as follows.

$$x=FI \times amp$$

Here, x represents the sensor output value, FI the value indicated by the output signal of the sensor mechanism M1, and amp the sensitivity coefficient.

The function storage part M3 is one adapted to store a predetermined flow rate characteristic function with a sensor output value x as an input and a flow rate value y as an output. Note that in the present embodiment, the function storage part M3 is made to store a standard flow rate characteristic function f(x) as a default flow rate characteristic function. The standard flow rate characteristic function f(x) is one obtained by averaging flow rate characteristic functions prepared by actually measuring the relationships between a sensor output value x and a flow rate value y of multiple flow rate sensors having the same configuration as that of the correction target thermal type flow rate sensor. That is, in the standard flow rate characteristic function f(x), specific differences accidentally occurring in the respective thermal type flow rate sensors are averaged.

The flow rate calculation part M4 is configured to calculate a flow rate value y on the basis of the senor output value x calculated by the sensor output calculation part M2 and a flow rate characteristic function stored in the function storage part M3 at the time.

Next, flow rate control by the valve control part VC in the mass flow controller MFC will be described.

The valve control part VC is configured to switch between two types of feedback control to perform any one. That is, the valve control part VC can perform any of the two types of control, i.e., sensor output value control adapted to feed back the sensor output value x and flow rate value control adapted to feed back the flow rate value y. The sensor output value control is a mode mainly used to obtain a value necessary for the correction by the correction device 100. In this mode, the opening level of the valve V is controlled so as to decrease the deviation between a target sensor output value x given as a target value and the sensor output value x outputted from the sensor output calculation part M2. Meanwhile, the flow rate value control is a mode mainly used for actual flow rate control. In this mode, the opening level of the valve V is controlled so as to decrease the deviation between a target flow rate value y give as a target value and the flow rate value y outputted from the flow rate calculation part M4.

Also, in order for the correction device 100 to correct the correction target thermal type flow rate sensor, a reference flow rate sensor BM serving as a reference is provided on the upstream or downstream side of the mass flow controller MFC. The reference flow rate sensor BM is, for example, a pressure type flow rate sensor of which the output value is assured with predetermined accuracy. That is, the correction device 100 is configured to correct the correction target thermal type flow rate sensor on the basis of the sensor output value x and flow rate value y outputted from the correction target thermal type flow rate sensor and the flow rate value y indicated by the reference flow rate sensor BM as a reference.

Next, the details of the correction device 100 will be described. In the following, the flow rate characteristic function initially set as a numerical expression in the function storage part M3 of the correction target flow rate sensor CM is described as the standard flow rate characteristic function f(x) to distinguish from an actual flow rate characteristic function F(x) or G(x) as a flow rate characteristic function actually inherent in the correction target flow rate sensor CM. Note that the actual flow rate characteristic function F(x) or G(x) is an unknown function, and reflects the specific difference of each correction target flow rate sensor CM. The correction made by the correction device 100 is to bring the standard flow rate characteristic function f(x) set in the correction target flow rate sensor CM close to the actual flow rate characteristic function G(x) having adjusted sensitivity. In the present embodiment, the first step of the correction is to improve the linearity of the actual flow rate characteristic function F(x) by changing the sensitivity coefficient set in the sensor output calculation part M2. After that, the correction is made so as to match the standard flow rate characteristic function f(x) with the sensitivity-adjusted actual flow rate characteristic function G(x).

More specifically, the correction device 100 implements its functions in such a way that, for example, in a computer including a CPU, memory, input/ouput means, and the like, a program for the correction device 100 stored in the memory is executed, and thereby various devices cooperate.

That is, the correction device 100 is one that fulfills functions as at least a first measured value storage part 1, sensitivity setting part 2, second measured value storage part 3, function calculation part 4, correction term calculation part 5, and function modification part 6.

Together with a correction method employed by the correction device 100, the details of the respective parts will be described. Note that the fluid flowing through the flow path when obtaining the flow rate value y from the correction target flow rate sensor CM for the correction is standard gas such as nitrogen gas.

Figure 2A:
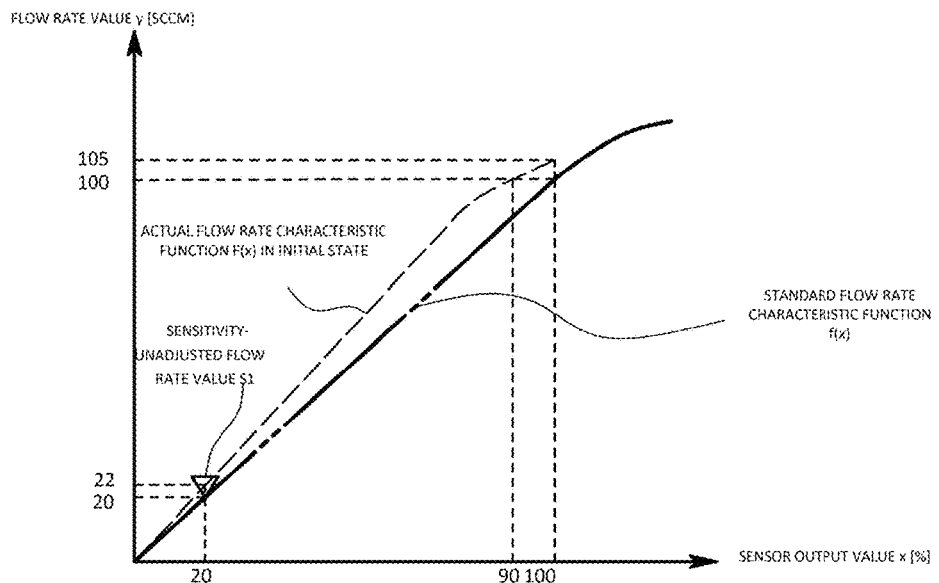
FIGS. 2(a) and 2(b) are graphs illustrating a sensitivity adjustment result in the same embodiment.

Also, it is assumed that the standard flow rate characteristic function f(x) is a function of which as illustrated in FIG. 2(a), the linearity is substantially kept within the range of the sensor output value x.

As compared with such a standard flow rate characteristic function f(x), the linearity of the actual flow rate characteristic function F(x) in the initial state is poor, and for example, a flow rate value y corresponding to each sensor output value x may be larger. In the following, the description will be given on the basis of the case where the actual flow rate characteristic function F(x) in the initial state is a function that is convex upward with respect to the standard flow rate characteristic function f(x).

First, the mass flow controller MFC is activated on the basis of feedback-controlling the sensor output value x, and the flow rate is controlled so as to output the target sensor output value x from the correction target flow rate sensor CM in the initial state. In addition, the flow rate is also controlled so as to, as a target sensor flow rate value y, obtain a sensor output value x that is 20% of the span. At this time, the flow rate value y of the fluid actually flowing through the flow path is measured by the reference flow rate sensor BM and stored in the first measured value storage part 1 as a first flow rate value F1. In addition, the flow rate value y outputted from the correction target flow rate sensor when the fluid flows through the flow path at the first flow rate value F1 is also stored in the first measured value storage part 1 as a sensitivity-unadjusted flow rate value S1. That is, as illustrated in FIG. 2(a), the first measured value storage part 1 stores the one measured value on the actual flow rate characteristic function having unadjusted sensitivity and the one measured value on the standard flow rate characteristic function f(x) having unadjusted sensitivity.

The sensitivity setting part 2 sets the sensitivity coefficient of the correction target flow rate sensor CM to be in a state where an initial value is multiplied by a sensitivity correction value m, and the sensitivity of the flow rate sensor CM is adjusted. In other words, the sensitivity setting part 2 is one that changes the sensitivity coefficient of the correction target flow rate sensor CM on the basis of the two flow rate values y stored in the first measured value storage part 1 to change the shape of the actual flow rate characteristic function F(x) itself.

Figure 2B:
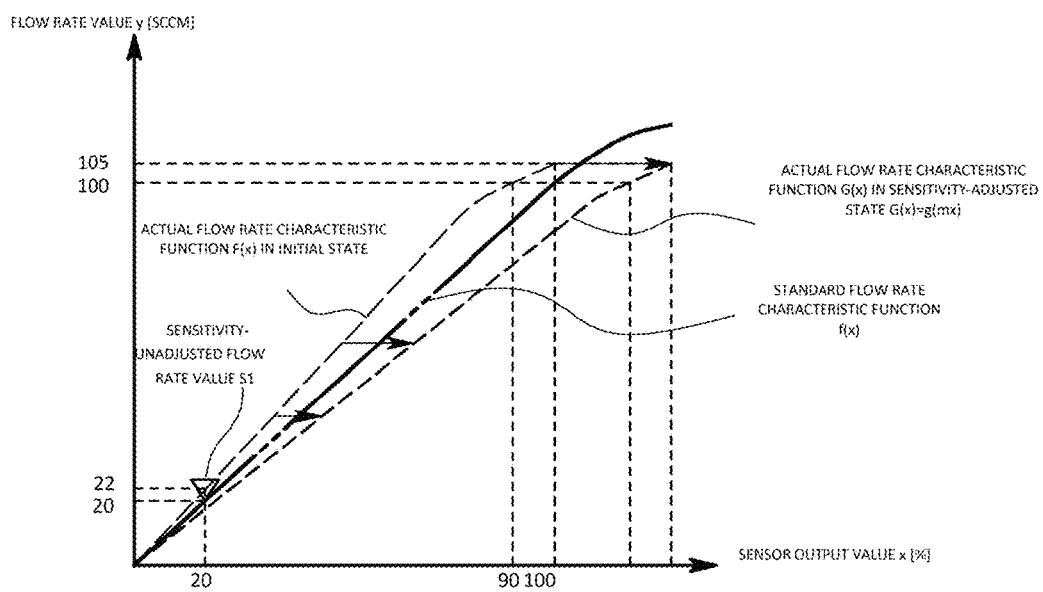

More specifically, the sensitivity setting part 2 is configured to change the sensitivity correction value m depending on the difference between the first flow rate value F1 and the sensitivity-unadjusted flow rate value S1. When the sensitivity coefficient of the correction target flow rate sensor CM is changed, as illustrated in FIG. 2(*b*), the actual flow rate characteristic function F(x) in the initial state is changed to the actual flow rate characteristic function G(x) in a sensitivity-adjusted state, which is m times the actual flow rate characteristic function F(x) in the sensor output value axis direction. In this example, the initial state actual flow rate characteristic function F(x) having poor linearity is enlarged in the sensor output value axis direction, and the increase amount of a flow rate value y per unit sensor output value x is decreased. Accordingly, the sensitivity-adjusted actual flow rate characteristic function G(x) is one improved in linearity as compared with the initial state actual flow rate characteristic function F(x). On the other hand, even when the sensitivity coefficient is changed, the graph shape of the standard flow rate characteristic function f(x) remains as it was without any change. Accordingly, by appropriately selecting the sensitivity correction value m, the linearity of the sensitivity-adjusted actual flow rate characteristic function G(x) substantially matches the linearity of the standard flow rate characteristic function f(x).

In the first embodiment, the sensitivity setting part 2 includes an adjustment effect storage part 21 and a sensitivity determination part 22.

Figure 3:
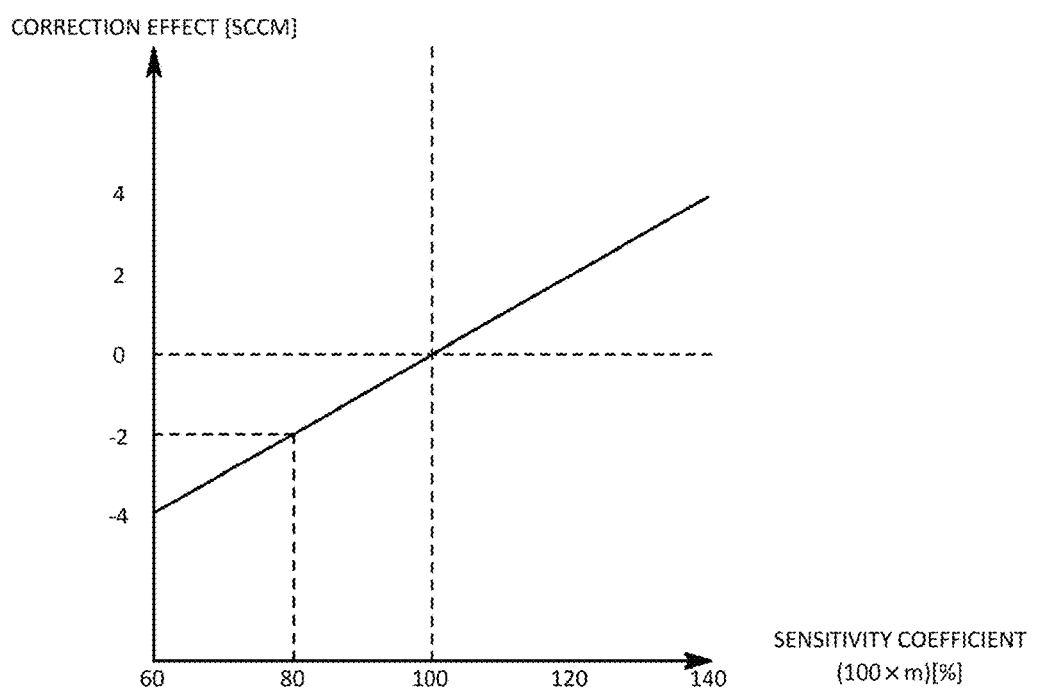
FIG. 3 is a graph illustrating an adjustment effect relationship used to determine a sensitivity correction value m in a sensitivity adjustment step in the same embodiment.

The adjustment effect storage part 21 stores an adjustment effect relationship that is the relationship between the sensitivity correction value m and a flow rate error newly occurring when setting the sensitivity coefficient based on the sensitivity correction value m. Note that the flow rate error newly occurring refers to the difference between at a predetermined sensor output value x, an actual flow rate value y and a flow rate value y outputted from the flow rate sensor. That is, in the first embodiment, an adjustment effect produced depending on the sensitivity correction value m at the sensor output value x at the time when the fluid flows in the flow path at the first flow rate value F1 is stored. As illustrated in a graph of FIG. 3, the adjustment effect relationship can be substantially expressed by a linear function independently of the type of fluid, and as a larger value is set as the sensitivity correction value m to increase the sensitivity coefficient, the adjustment effect more greatly acts in the plus direction. Note that the adjustment effect relationship illustrated in FIG. 3 is a relationship that can be obtained, for example, experimentally.

The sensitivity determination part 22 determines, on the basis of the adjustment effect relationship, the sensitivity correction value m that cancels out the difference between the first flow rate value F1 and the sensitivity-unadjusted flow rate value S1. In the first embodiment, since at the sensor output value x of 20%, an error of 2 sccm occurs between the first flow rate value F1 and the sensitivity-unadjusted flow rate value S1, it turns out from the graph of FIG. 3 that by selecting a sensitivity correction value m of 0.8 so as to make the sensitivity coefficient equal to 80%, the flow rate error at the sensor output value of 20% can be substantially eliminated. Accordingly, the sensitivity determination part 22 sets m=0.8 as the sensitivity correction value m to change the sensitivity coefficient used in the sensor output calculation part M2 of the correction target flow rate sensor CM to 80%. Such a change makes it possible to change the sensitivity coefficient to the minimum necessary extent and substantially match the linearity of the standard flow rate characteristic function f(x) and the linearity of the sensitivity-adjusted actual flow rate characteristic function G(x).

Next, a procedure for correcting the correction target flow rate sensor CM in the sensitivity-adjusted state will be further described.

Figure 4A:
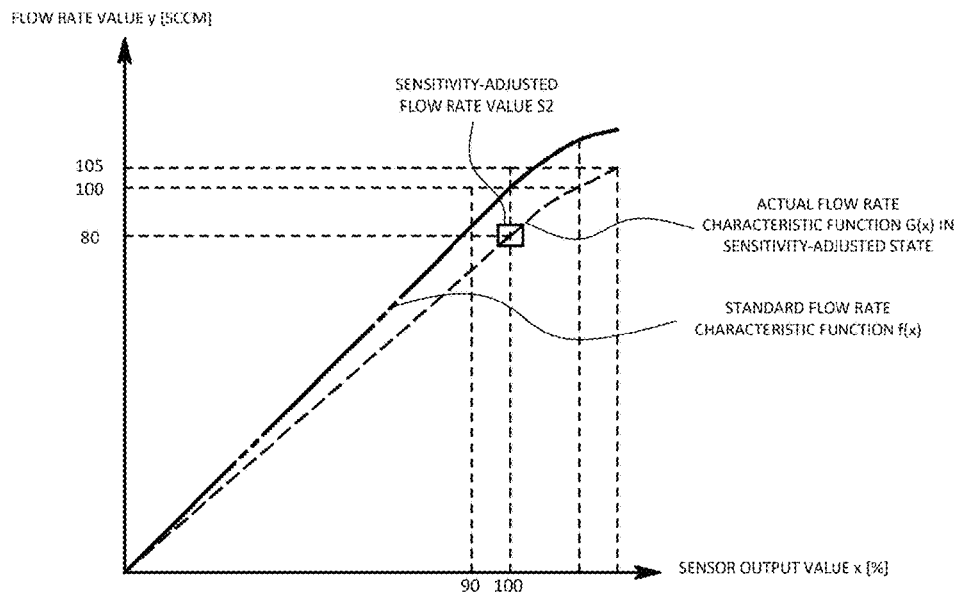
FIGS. 4(a) and 4(b) are graphs illustrating a function correction result in the same embodiment.
Figure 4B:
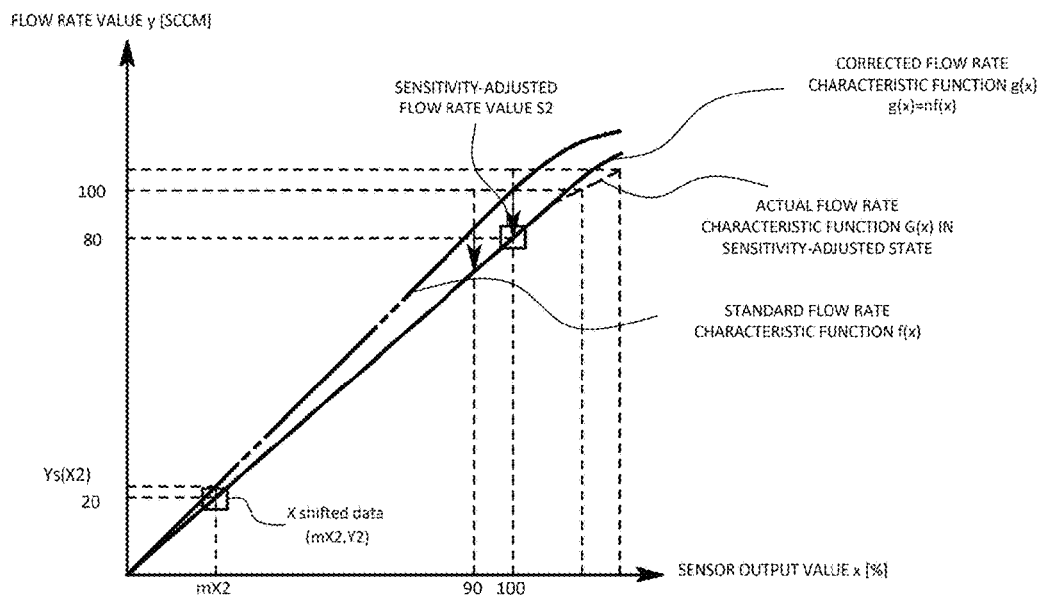

As illustrated in FIG. 4(*a*), this time, the flow rate is controlled by the sensitivity-adjusted mass flow controller MFC so as to make the sensor output value x equal to 100%, and a second flow rate value y that is a flow rate measured by the reference flow rate sensor BM, and a sensitivity-adjusted flow rate value y that is a flow rate value y outputted from the correction target flow rate sensor CM in the sensitivity-adjusted state at the time are stored in the second measured value storage part 3. Using these two flow rave values y, the standard flow rate characteristic function f(x) is enlarged/reduced in the flow rate value y direction. In other words, a span correction is made such that the standard flow rate characteristic function f(x) substantially matches the actual flow rate characteristic function F(x) in the sensitivity-adjusted state within the range of the sensor output value x.

More specifically, the function calculation part 4 multiplies the standard flow rate characteristic function f(x) by a function correction value n to calculate a corrected flow rate characteristic function g(x). Note that the function correction value n is a value obtained by dividing the second flow rate value F2 by the sensitivity-adjusted flow rate value S2. The corrected flow rate characteristic function g(x) calculated as described above substantially matches the actual flow rate characteristic function F(x) in the sensitivity-adjusted state over the sensor output value x range of 0 to 100% as illustrated in FIG. 4(*b*). Thus, the calculated corrected flow rate characteristic function g(x) can reduce the flow rate error over the entire range of the sensor output value x when the nitrogen gas used for the correction or helium gas having higher thermal conductivity than nitrogen gas flows through the flow path. Note that the function correction value n is not limited to the one calculated on the basis of the flow rate value y at the sensor output value x of 100%. For example, the function correction value n may be determined on the basis of a flow rate value y at a sensor output value x of another percentage such as 80%. Also, the sensitivity correction values m and the function correction value n determined as described above can be used not only to calculate the flow rate of the nitrogen gas actually flowed through the flow path for the correction but the same values can also be used to calculate the flow rate of another type of fluid.

Figure 5:
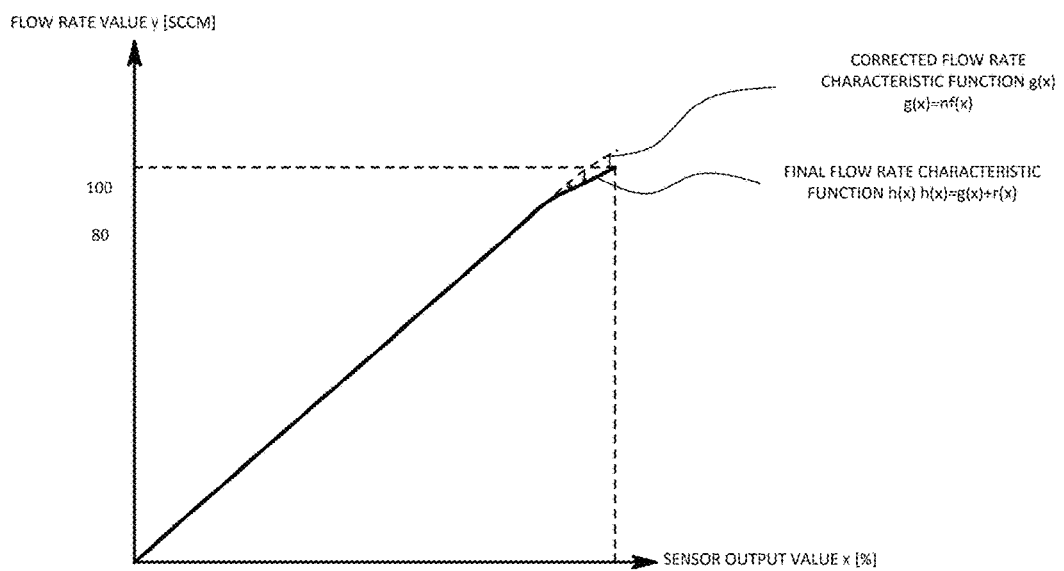
FIG. 5 is a graph illustrating a thermal conductivity correction result in the same embodiment.

On the other hand, as illustrated in FIG. 5, when gas having lower thermal conductivity than nitrogen gas flows in the flow path, the corrected flow rate characteristic function g(x) and the actual flow rate characteristic function F(x) in the sensitivity-adjusted state are unlikely to match in a range where the sensor output value x is large. Accordingly, when directly using the corrected flow rate characteristic function g(x), as the span flow rate value y of 100, an accurate value cannot be outputted.

For this reason, in order to make it possible for the correction target flow rate sensor CM to output the span flow rate value y of 100 sccm without error, the correction term calculation part 5 calculates a correction term that acts only in a range where the sensor output value x is large.

The correction term calculation part 5 is configured to calculate the correction term on the basis of the thermal conductivity λ of the fluid and the sensitivity correction value m. More specifically, the correction term is one obtained by multiplying the product of the sensitivity correction value m and the square of the reciprocal of the thermal conductivity λ of the fluid by the fourth power of the sensor output value x. That is, the present inventors have found that in a range where the sensor output value x is larger than a predetermined value, a flow rate error is significantly different depending on the type of fluid. For example, the correction term is as follows.

$$C(\lambda, x, m) = (const1 \times m) \times ((1/\lambda)^2 - const2) \times (x)^4$$

Here, C represents the correction term, m the sensitivity correction value, λ thermal conductivity determined for each type of fluid, x the sensor output value, and const 1 and const 2 constants. Note that the multiplier of (1/λ) is not limited to 2 but may be 1 or more. The multiplier may be a value such as 1.5 or 3. Also, the multiplier of the sensor flow rate value x is not limited to 4, but may be any of various values such as 2, 2.5 and 3.

Finally, the function modification part 6 calculates a final flow rate characteristic function h(x) by adding the correction term calculated by the correction term calculation part 5 to the corrected flow rate characteristic function g(x) calculated by the function calculation part 4. As illustrated in FIG. 5, the final flow rate characteristic function h(x) substantially completely matches the sensitivity-adjusted actual flow rate characteristic function F(x). Also, the function modification part 6 makes the function storage part M3 of the correction target flow rate sensor CM newly store the final flow rate characteristic function h(x) as the standard flow rate characteristic function f(x).

The correction device 100 configured as described above can change the actual flow rate characteristic function F(x) itself, which is the matching target of the standard flow rate characteristic function f(x), to improve linearity by adjusting the sensitivity coefficient, and then make the span correction. Accordingly, first, the corrected flow rate characteristic function g(x) substantially matching the sensitivity-adjusted actual flow rate characteristic function G(x) within the range of 0 to 100% that is the standard range of the sensor output value x can be obtained. Further, the flow rate error occurring depending on the thermal conductivity of the fluid in the range where the sensor output value x is large can be eliminated by adding the correction term. As a result, the final flow rate characteristic function h(x) that is the sum of the corrected flow rate characteristic function g(x) and the correction term can completely match the sensitivity-adjusted flow rate characteristic function G(x).

For this reason, by exchanging with the final flow rate characteristic function h(x) as the standard flow rate characteristic function f(x) of the correction target flow rate sensor CM, a flow rate error can be suppressed from occurring over the entire range, and the span flow rate value y of 100 sccm can also be accurately outputted.

Figure 6:
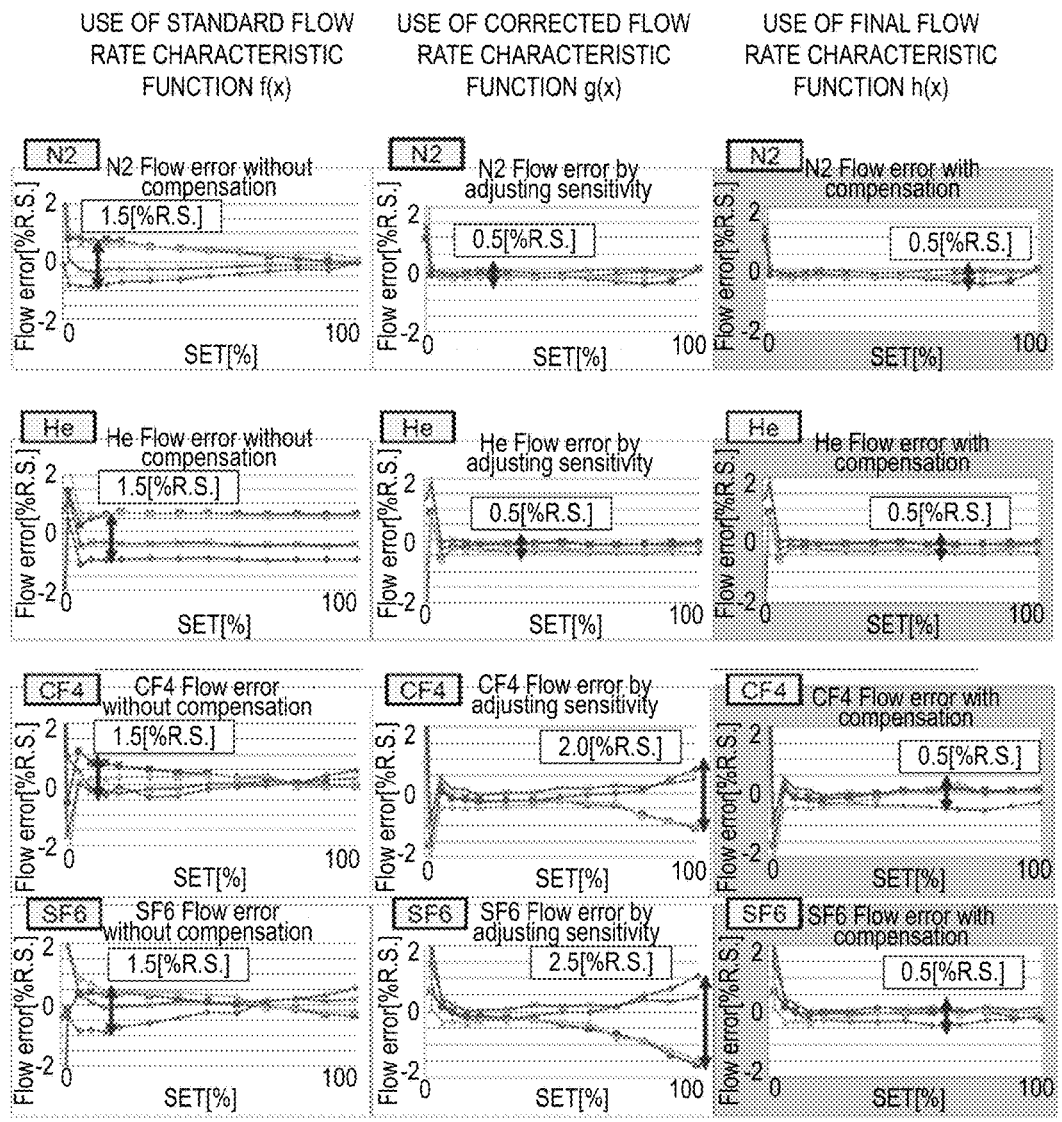
FIG. 6 is a graph illustrating correction results in various types of fluid using the same embodiment.
Figure 7A:
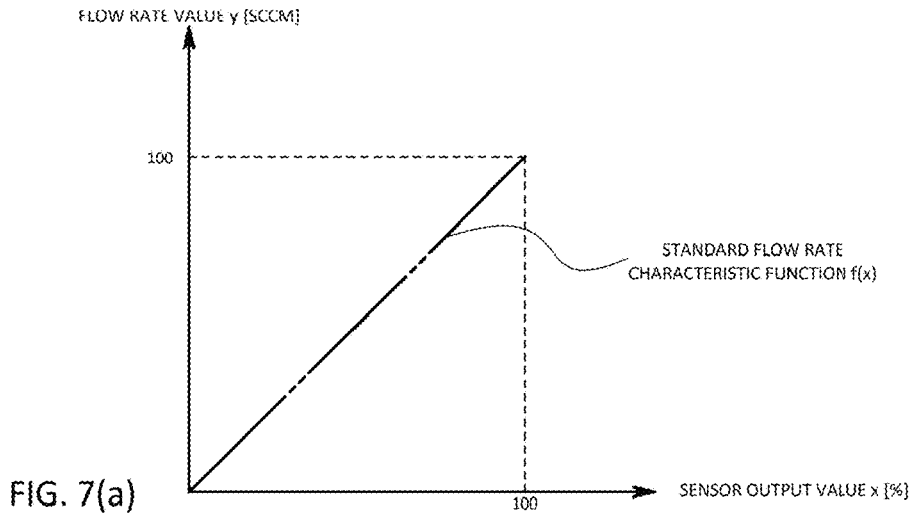
FIGS. 7(a) to 7(c) are graphs illustrating a conventional correction method.
Figure 7B:
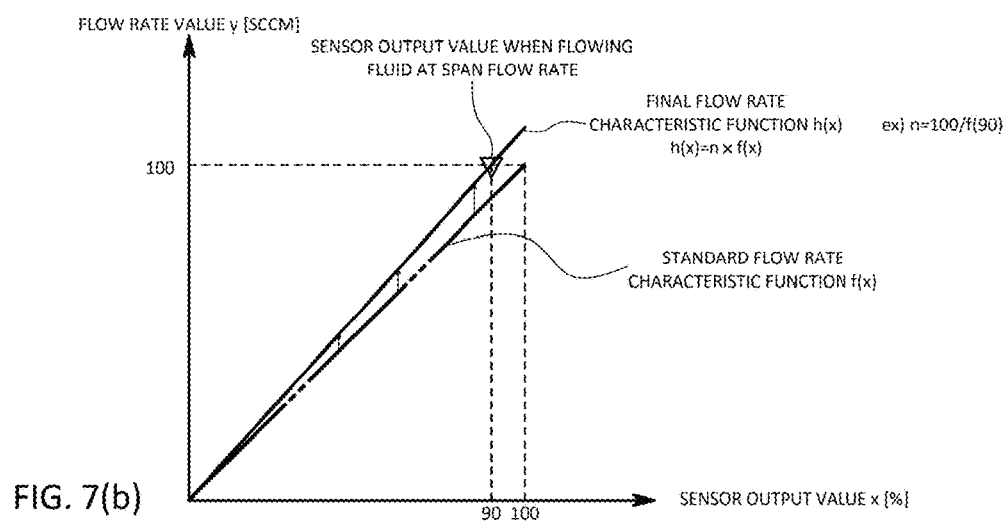
Figure 7C:
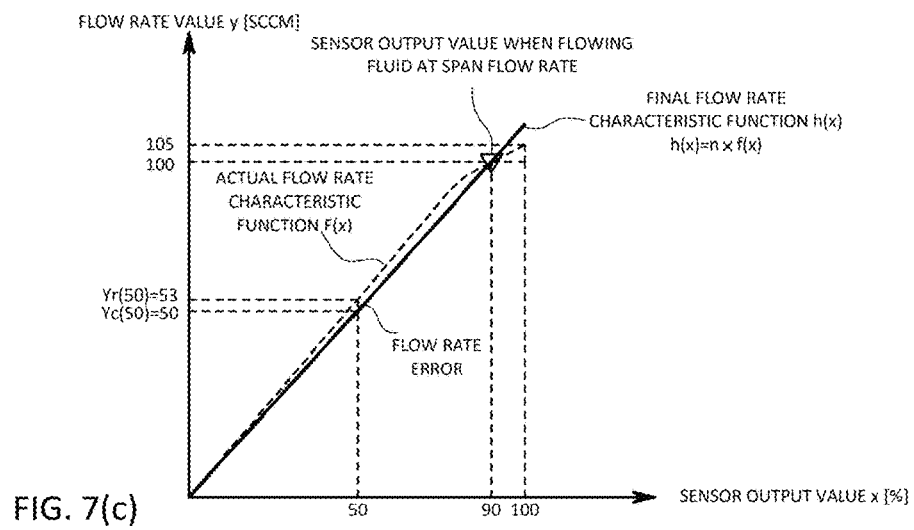

Graphs in FIG. 6 illustrate examples of making such a correction. As can be seen from the graphs in FIG. 6, as compared with a conventional correction method that does not adjust sensitivity, over the entire range of the sensor output value x, a flow rate error can be made substantially uniform and reduced. Also, independently of the type of fluid, substantially the same flow rate error can be achieved over the entire range of the sensor output value.

Other embodiments will be described.

Methods for determining the sensitivity correction values m and the function correction value n are not limited to those in the above-described embodiment. The sensitivity correction value m and the function correction value n may be determined by algorithms such as a least square method. In this case, it is only necessary to obtain pieces of measured data on at least two sets of a sensor output value x and a flow rate value y and then perform optimization. Also, in the above-described embodiment, the sensitivity coefficient is first adjusted using the sensitivity correction value m, and then the standard flow rate characteristic function f(x) is multiplied by the function correction value n to match the corrected flow rate characteristic function g(x) and the sensitivity-adjusted actual flow rate characteristic function G(x); however, this procedure may be reversed. That is, it may be adapted to multiply the standard flow rate characteristic function f(x) by the function correction value n to obtain the corrected flow rate characteristic function g(x) first, then appropriately select the sensitivity correction value m to adjust the sensitivity coefficient, and match the sensitivity-adjusted actual flow rate characteristic function G(x) with the corrected flow rate characteristic function g(x).

Also, it may be adapted to change the sensitivity correction value m multiple times, and each time, search for the sensitivity correction value m meeting the condition that at a predetermined sensor output value x, a flow rate value y of the sensitivity-adjusted actual flow rate characteristic function match a flow rate value y of the standard flow rate characteristic function f(x) with a predetermined error interposed. That is, an appropriate value may be selected as the sensitivity correction value m by trial and error.

Further, it may be adapted to directly or indirectly measure the diameter of a bypass flow path of the correction target flow rate sensor and on the basis of a result of the measurement, determine whether to make the sensitivity correction value m larger than 1 or smaller than 1. For example, at any time before assembling the correction target flow rate sensor, the diameter of the bypass flow path can be measured with a microscope or the like. When the diameter of the bypass flow path is smaller than a design value, the flow rate of the fluid flowing through the sensor flow path is increased, and therefore the actual flow rate characteristic function F(x) is present in the upper area than the standard flow rate characteristic function f(x). Accordingly, in order to obtain G(x) in which the linearity of the actual flow rate characteristic function F(x) is improved, it is only necessary to set the sensitivity correction value m to be less than 1. On the other hand, when the diameter of the bypass flow path is larger than the design value, the flow rate of the fluid flowing through the sensor flow path is decreased, and therefore the actual flow rate characteristic function F(x) is present in the lower area than the standard flow rate characteristic function f(x). Accordingly, in order to obtain G(x) in which the linearity of the actual flow rate characteristic function F(x) is improved, it is only necessary to set the sensitivity correction value m to be more than 1.

Alternatively, on the basis of a differential pressure occurring in the bypass flow path of the correction target flow rate sensor when flowing the fluid at a certain prescribed flow rate, it may be determined whether to make the sensitivity correction value m larger than 1 or smaller than 1.

In addition, the sensitivity correction value m is not limited to the one by which the initial value is multiplied, but may be one adding to the initial value. Similarly, the function correction value n is not limited to the one by which the standard flow rate characteristic function f(x) is multiplied, but may be one adding to the standard flow rate characteristic function f(x). The standard flow rate characteristic function f(x) in not limited to the experimentally obtained one as in the above-described embodiment, but may be, for example, a theoretical formula or the like. As the final flow rate characteristic function h(x), without adding the correction term, the corrected flow rate characteristic function g(x) itself may be used.

The correction target flow rate sensor is not limited to the thermal type one described in the above-described embodiment. In order to correct a flow rate sensor based on another measurement principle, the correction device and the correction method in the above-described embodiment may be used.

Besides, various combinations and modifications of the embodiments may be made without departing from the scope of the present invention.

LIST OF REFERENCE CHARACTERS

100: Correction device
1: First measured value storage part
2: Sensitivity setting part
21: Adjustment effect storage part
22: Sensitivity determination part
3: Second measured value storage part
4: Function calculation part
5: Correction term calculation part
6: Function modification part

The invention claimed is:

1. A correction device that corrects a flow rate characteristic function of a flow rate sensor comprising: a sensor mechanism adapted to output an output signal corresponding to a flow rate of fluid flowing through a flow path; a sensor output calculation part adapted to calculate a sensor output value x on a basis of a value indicated by the output signal and a sensitivity coefficient; a function storage part adapted to store the flow rate characteristic function with the sensor output value x as an input and a flow rate value y as an output; and a flow rate calculation part adapted to calculate the flow rate value y on a basis of the sensor output value x calculated by the sensor output calculation part and the flow rate characteristic function, the correction device comprising:
    a sensitivity setting part adapted to set the sensitivity coefficient on a basis of an initial value and a sensitivity correction value m and adjust a sensitivity of the flow rate sensor;
    a function calculation part adapted to calculate a corrected flow rate characteristic function g(x) on a basis of a function correction value n and a standard flow rate characteristic function f(x), the function correction value n being determined on a basis of the flow rate value y outputted from the flow rate sensor after the sensitivity coefficient of the flow rate sensor has been changed by the sensitivity setting part; and
    a function modification part adapted to make the function storage part store, as the flow rate characteristic function, a final flow rate characteristic function h(x) based on the corrected flow rate characteristic function g(x) calculated by the function calculation part.

2. The correction device according to claim 1, further comprising
    a first measured value storage part adapted to, when the fluid flowing through the flow path at a first flow rate value F1, store the first flow rate value F1 and a sensitivity-unadjusted flow rate value S1 that is the flow rate value y outputted from the flow rate sensor in an initial state where the sensitivity coefficient is set to the initial value, wherein
    the sensitivity setting part is configured to change the sensitivity correction value m depending on a difference between the first flow rate value F1 and the sensitivity-unadjusted flow rate value S1.

3. The correction device according to claim 2, wherein the sensitivity setting part comprises:
    an adjustment effect storage part adapted to store an adjustment effect relationship that is a relationship between the sensitivity correction value m and a difference between when setting the sensitivity coefficient based on the sensitivity correction value m, an actual flow rate value y newly produced at a predetermined sensor output value x and the flow rate value y outputted from the flow rate sensor; and
    a sensitivity determination part adapted to, on a basis of the adjustment effect relationship, determine the sensitivity correction value m that cancels out the difference between the first flow rate value F1 and the sensitivity-unadjusted flow rate value S1.

4. The correction device according to claim 2, wherein the first flow rate value F1 is a flow rate value y smaller than a span of the flow rate value y, the span being set in the flow rate sensor.

5. The correction device according to claim 1, further comprising
    a second measured value storage part adapted to, when the fluid flowing through the flow path at a second flow rate value F2, store the second flow rate value F2 and a sensitivity-adjusted flow rate value S2 that is the flow rate value y outputted from the flow rate sensor after sensitivity adjustment, wherein
    the function calculation part is configured to multiply the standard flow rate characteristic function f(x) by as the function correction value n, a value obtained by dividing the second flow rate value F2 by the sensitivity-adjusted flow rate value S2.

6. The correction device according to claim 5, wherein the second flow rate value F2 is a span of the flow rate value y, the span being set in the flow rate sensor.

7. The correction device according to claim 1, further comprising
    a correction term calculation part adapted to calculate a correction term on a basis of thermal conductivity λ of the fluid and the sensitivity correction value m, wherein
    the function modification part is configured to calculate the final flow rate characteristic function h(x) by adding the correction term to the corrected flow rate characteristic function g(x), and make the function storage part store the final flow rate characteristic function h(x).

8. The correction device according to claim 7, wherein the correction term is one obtained by multiplying a product of the sensitivity correction value m and a square of a reciprocal of the thermal conductivity λ of the fluid by a fourth power of the sensor output value x.

9. A flow rate sensor configured to output a flow rate value y on a basis of the final flow rate characteristic function h(x) stored by the correction device according to claim 1.

10. A flow rate control device comprising the flow rate sensor according to claim 9.

11. An apparatus comprising: a processor, and memory storing instructions that, when executed by the processor, cause the apparatus to: output an output signal corresponding to a flow rate of fluid flowing through a flow path; calculate a sensor output value x on a basis of a value indicated by the output signal and a sensitivity coefficient; store a flow rate characteristic function with the sensor output value x as an input and a flow rate value y as an output; calculate a flow rate value y on a basis of the sensor output value x and the flow rate characteristic function;

set the sensitivity coefficient on a basis of an initial value and a sensitivity correction value m and adjust a sensitivity of a flow rate sensor by changing the sensitivity coefficient of the flow rate sensor;

calculate a corrected flow rate characteristic function g(x) on a basis of a function correction value n and a standard flow rate characteristic function f(x), the function correction value being determined on a basis of the flow rate value y outputted from the flow rate sensor; and store, as the flow rate characteristic function, a final flow rate characteristic function h(x) based on the corrected flow rate characteristic function g(x).

12. A correction method that corrects a flow rate characteristic function of a flow rate sensor comprising: a sensor mechanism adapted to output an output signal corresponding to a flow rate of fluid flowing through a flow path; a sensor output calculation part adapted to calculate a sensor output value x on a basis of a value indicated by the output signal and a sensitivity coefficient; a function storage part adapted to store the flow rate characteristic function with the sensor output value x as an input and a flow rate value y as an output; and a flow rate calculation part adapted to calculate a flow rate value y on a basis of the sensor output value x calculated by the sensor output calculation part and the flow rate characteristic function, the correction method comprising steps of:

setting the sensitivity coefficient on a basis of an initial value and a sensitivity correction value m and adjusting a sensitivity of the flow rate sensor by changing the sensitivity coefficient of the flow rate sensor;

calculating a corrected flow rate characteristic function g(x) on a basis of a function correction value n and a standard flow rate characteristic function f(x), the function correction value n being determined on a basis of the flow rate value y outputted from the flow rate sensor; and making the function storage part store, as the flow rate characteristic function, a final flow rate characteristic function h(x) based on the calculated corrected flow rate characteristic function g(x).

\* \* \* \* \*